United States Patent Office 2,939,779
Patented June 7, 1960

2,939,779
PYROTECHNIC COMPOSITIONS

Jean A. M. Brock, St. Louis, Mo., assignor to Olin Mathieson Chemical Corporation, East Alton, Ill., a corporation of Virginia No Drawing. Filed Apr. 9, 1958, Ser. No. 727,278

3 Claims. (Cl. 52—23)

This invention relates to pyrotechnic compositions and particularly to white smoke formulations.

White smoke formulations containing hexachlorethane with or without zinc oxide are well known. While such compositions have been used, they have many inherent disadvantages. The amount and quality of the white smoke generated by such prior art compositions have been recognized to be definitely lacking but until the advent of the present invention, no significant improvement has been made in such compositions. White smoke formulations are normally used in a granular form. Such dry mixtures are difficult to load and ignition difficulties have also been experienced in connection with them. The advisability of utilizing a binder with such formulations to provide a consolidated body of pyrotechnic compositions has presented itself in the past but never proved feasible, because after the smoke-forming compositions have been charged into the proper type of canister or other container, the charges with the binder are apt to shrink and draw away from the walls of the container. This exposure of the lateral surfaces of the charge has an adverse influence on its burning rate and is undesirable.

It is, therefore, an object of this invention to provide a novel white smoke formulation overcoming the disadvantages of the prior art. Another object of this invention is to provide an improved pyrotechnic composition that can be hand packed or extruded. A further object of this invention is to provide a novel composition capable of producing copious clouds of dense white smoke. A more specific object of this invention is to provide an improved hexachlorethane-zinc oxide white smoke formulation.

In accordance with this invention, generally stated, these and other objects are accomplished by providing a white smoke composition containing zinc oxide, hexachlorethane, ammonium perchlorate and a plastic binder. More specifically, this invention contemplates a white smoke formulation consisting essentially of stoichiometric proportions of hexachlorethane, zinc oxide, ammonium perchlorate and an organic thermoplastic resinous binder. The binders that can be used in accordance with this invention are polyvinyl acetate, the epoxy resins and the polyester resins. The term "epoxy resin" is used herein in its normal sense to designate a polymer containing diphenylolpropane and glycidyl units, derived from phenol, acetone, and epichlorohydrin, polymerized with the aid of a polyamine catalyst or a polyamide catalyst. The term "polyester" is also used in its popular sense to designate a polymer obtained by polymerizing an unsaturated ester such as diallyl phthalate, suitably modified with, for example, styrene monomers. These binders, upon combustion, yield essentially water together with carbon and oxygen which combine to form oxides of carbon. The water combines with the ammonium chloride resulting from burning the composition to provide a particularly dense white smoke fortifying the normally produced zinc chloride smoke.

While optimum results are normally obtained, when substantially stoichiometric proportions of the components including the binder are utilized in the formulation of this invention, the relative amounts of the various ingredients can vary within limits. Thus, it has been found that operable compositions are obtained when the percentage composition by weight of the formulation is maintained within the following approximate ranges:

| | Percent |
|---|---|
| Hexachlorethane | 30–45 |
| Zinc oxide | 30–45 |
| Ammonium perchlorate | 14–25 |
| Binder | 2–7½ |

The hexachlorethane and zinc oxide are relied upon in these compositions for the production of zinc chloride and ammonium chloride, both of which are smoke-forming components. When less than 30% of either of these ingredients is included in the formulations, the amount of white smoke obtained is definitely inferior and, in addition, the reaction proceeds inordinately fast because of the relative excess of ammonium perchlorate. On the other hand, mixtures containing more than 45% of each of these components are extremely slow burning and the utilization of such additional chloride donors does not enhance the characteristics of the composition. The ammonium perchlorate must be maintained within the above limits to control the rate of reaction and to insure complete combustion. In like manner, the binder must be maintained within the above ranges in order to provide adequate functioning. When lesser amounts of binder are utilized, the mix is not cohesive. Mixtures containing larger amounts of binder than those indicated above burn too slowly, thus the utilization of excess binder destroys the advantageous characteristics of the compositions.

In preparing the white smoke formulations of the present invention, the various components can be mixed in any convenient manner. Thus, a dry mixture of the hexachlorethane, zinc oxide, and ammonium perchlorate can be prepared and then blended with a solution of the binder. Alternatively, the dry components can be added separately or in any combination or sequence to a solution of the binder. In any event, the ingredients are thoroughly mixed to provide a substantially homogeneous distribution of them throughout the composition. Any suitable solvent such as for example methylene chloride, ethyl acetate, acetone, and the like can be used to dissolve the plastic binder preparatory to the formation of the pyrotechnic formulations.

The manner in which the objects of this invention are achieved will be more readily understood by those skilled in the art by reference to the following detailed description of a preferred embodiment thereof. In this embodiment, all proportions are expressed in parts by weight.

A white smoke formulation was prepared by mixing about 375 parts of hexachlorethane with about 390 parts of zinc oxide and approximately 195 parts of ammonium perchlorate. After these components had been thoroughly mixed to provide a substantially homogeneous mixture, about 40 parts polyvinyl acetate dissolved in about 200 parts of methylene chloride were added. The mixing operation was then continued until the mixture was thoroughly and uniformly wet with the polyvinyl acetate solution.

The resultant formulation was charged into canisters which were about 1⅜ inches wide, about 2¾ inches thick, and about 4¾ inches high. These canisters, which were of light sheet metal, were provided with crimped lids, each of which had a ½ inch central perforation. When the formulation had dried, there was no contraction but actually a slight expansion so as to form a pressure fit between the wall of the canister and the white smoke mix. Upon ignition, this composition, which had a density of approximately 1.78, burned an average of about 62 seconds with the evolution of copious clouds of brilliant white smoke.

While the above example describes a particular method of formulating the compositions of this invention and also recites charging them into a specific type of container, it will be readily understood that other formulating means can be utilized and that the compositions can be provided wtih any suitable type of container. Thus, the compositions can be molded, extruded, hand packed or otherwise shaped and the consolidated body of the composition can then be provided with a suitable wrapper.

Having thus described the invention, what is claimed is:

1. A white smoke formulation consisting essentially of between about 30 percent and about 45 percent by weight of hexachlorethane, between about 30 percent and about 45 percent by weight of zinc oxide, between about 14 percent and about 25 percent by weight of ammonium perchlorate, and between about 2 percent and about 7.5 percent by weight of a plastic binder selected from the group consisting of polyvinyl acetate and epoxy resins.

2. The smoke formulation of claim 1 in which the plastic binder is polyvinyl acetate.

3. A white smoke formulation consisting essentially of 37.5 percent by weight of hexachlorethane, 39 percent by weight of zinc oxide, 19.5 percent by weight of ammonium perchlorate, and 4 percent by weight of polyvinyl acetate.

References Cited in the file of this patent

UNITED STATES PATENTS

| | | |
|---|---|---|
| 2,171,379 | Wahl | Aug. 29, 1939 |
| 2,410,801 | Audrieth | Nov. 12, 1946 |

FOREIGN PATENTS

| | | |
|---|---|---|
| 127,031 | Great Britain | May 29, 1919 |

OTHER REFERENCES

"Military Explosives," TM9–1910, TO11A–1–34, April 1955, pages 275–276.